June 12, 1962 R. W. BROWN ET AL 3,038,716
AUTOMOBILE SUSPENSION
Original Filed July 11, 1955 2 Sheets-Sheet 1

INVENTORS.
ROY W-BROWN
JACK L-HOLLIS
BY
W. A. Fraser
ATTY-

June 12, 1962  R. W. BROWN ET AL  3,038,716
AUTOMOBILE SUSPENSION

Original Filed July 11, 1955   2 Sheets-Sheet 2

INVENTORS
ROY W. BROWN
JACK L. HOLLIS
BY
W. A. Fraser
ATTY-

United States Patent Office 3,038,716
Patented June 12, 1962

3,038,716
AUTOMOBILE SUSPENSION
Roy W. Brown, Chagrin Falls, and Jack L. Hollis, Cuyahoga Falls, Ohio, assignors to The Firestone Tire & Rubber Company, Akron, Ohio, a corporation of Ohio
Continuation of application Ser. No. 521,031, July 11, 1955. This application Feb. 24, 1960, Ser. No. 11,118
1 Claim. (Cl. 267—65)

This invention relates to suspensions for automotive vehicles and more particularly to a suspension utilizing an improved bellows of the type which has come to be known as an "air spring." This application is a continuation of application Serial No. 521,031, filed July 11, 1955, now abandoned.

Present day automobiles demand suspensions which will readily absorb both the major and minor shocks of service without transmitting such shocks to the vehicle frame and to the occupants of the automobile. Such performance is, moreover, required for all conditions of loading, with the quality of the ride being independent of the number of passengers in the automobile. These requirements have been only partially met by using metallic springs because the rate of such springs increases directly with the load imposed thereon. For example, if a car is loaded with only one passenger, the metal springs will have nearly their full stroke but will have a low rate, i.e. the springs will deflect easily in response to light shocks. In contrast, when the car is fully loaded, the springs are almost fully compressed and the springs have a high rate, that is the springs deflect only slightly in response to heavy shocks. Moreover, when the car is fully loaded, much of the travel of the spring is used up by the static loading and any irregularities in the road which exceed the remaining travel of the springs, will cause the springs to bottom and transmit the full shock to the car.

These disadvantages of metallic springs can be overcome and the rate characteristics which are demanded in automotive suspensions today can in large measure be obtained by the use of a bellows of the type known as an air spring, such as those shown and described in the U.S. patent to Brown No. 2,208,537. This invention is directed to improvements in such air springs.

Moreover, modern automobile styling today emphasizes a long, low sleek appearance which requires a car having a minimum road clearance. In order to achieve this, the suspension of such a car must occupy minimum space without sacrificing the required travel and other characteristics of the suspension. A conventional air spring bellows of the type shown and described in the above mentioned Brown patents cannot be readily mounted on such automobiles and still provide a length of stroke sufficient to absorb all the shocks of service.

The present invention provides the desired ride characteristics and solves these apparently incompatible requirements of minimum space and maximum stroke by providing a single convolution air spring bellows having beads of materially different diameter so that one bead can pass completely through the other during the working stroke of the bellows. This ability of the beads of such an air spring bellows to have a telescoping movement relative to each other enables the air spring bellows to have virtually the full stroke of a conventional double convolution air spring of equal rating while occupying only slightly more than half the space required of the conventional bellows. The construction is such that the bellows can also be successfully used in an automotive suspension where the bellows are subjected to an arcuate movement in a vertical plane. This ability of the bellows to undergo such an arcuate flexing provides a flexibility of use and performance which cannot be achieved in either a single or double convolution bellows of conventional design. As will be observed in more detail later the rate of the bellows is such that a ride of maximum comfort is obtained in otherwise conventional automobiles.

It is among the objects of the invention, therefore, to provide a bellows which while occupying a minimum of space has a large working stroke and which in addition can undergo flexing in an arcuate path of substantial curvature. Other objects are to provide a bellows which has good stability, which has desirable rate characteristics, which has a long service life under all conditions.

These and other objects and advantages will be more fully apparent from the following description of a preferred form of the invention, reference being had to the accompanying drawings in which.

The invention is described in connection with the suspension of a right front wheel of an automobile but it will be apparent that the bellows can be used to equal advantage with any wheel of any automotive vehicle.

Figure 1:
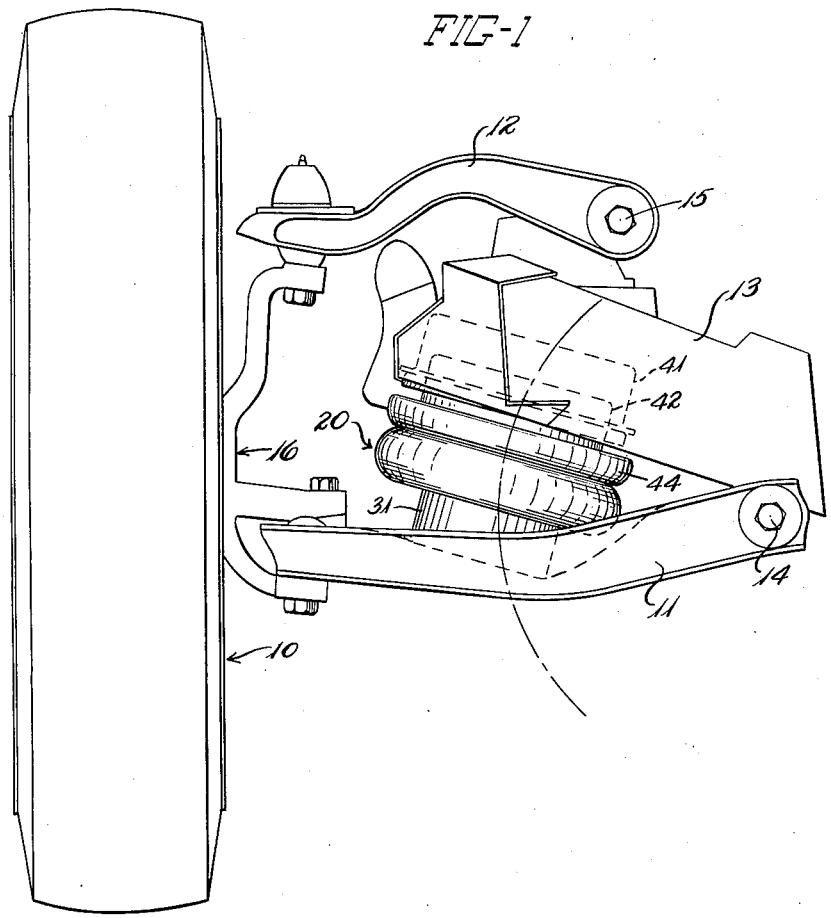
FIGURE 1 is a fragmentary front view of the right front wheel of an automobile and a suspension employing a bellows embodying the present invention.

As shown in FIGURE 1, a right front wheel 10 of an automobile is mounted on a pair of arms 11 and 12 which are suspended from the frame 13 of the automobile at the pivot points 14 and 15 respectively. The wheel 10 is journalled on a spindle (not shown) which is supported by a member, indicated generally at 16, which in turn is secured to the outer ends of arms 11 and 12. This suspension so far as it has been described is conventional and need not be described in further detail.

When the wheel 10 encounters a bump in the road, it will move upward and outward in an arcuate path indicated approximately by the dotted line in FIGURE 1, this movement being permitted by the pivoting of the arms 11 and 12 about their pivot points, with arm 11 moving upward toward the frame 13. This movement of the wheel is cushioned by an air spring or bellows, embodying the present invention, which is indicated generally at 20 and which is positioned between the lower arm 11 and the frame 13 of the automobile. The bellows contains air under an operating pressure of about 50 to 100 lbs. per square inch and, as will be seen, it is the variations in the air pressures within the bellows and the variations in the effective area of the bellows as it is deflected which provide the desired cushioning of the wheel movement.

The air spring 20, according to the present invention, takes the form of a single convolution bellows comprising a body 21 of two plies 22 and 23 of rubberized fabric having cords which preferably extend at an angle of about 15°–25° to the axis of the bellows, with the cords of one ply crossing the cords of the other. The interior of the bellows has a lining of rubber, preferably neoprene because of its oil resistant characteristics, to retain air within the bellows. The ends of the plies are wrapped about and anchored to a pair of circular beads 24 and 25 which are reinforced by cores 26 and 27 of steel wire respectively. In the present example, the top bead 25 is fixedly secured relative the frame 13 of the automobile and has an external diameter of about 7½" and an internal diameter of about 6 inches and the bottom bead 24 which moves with the arm 11 and the wheel 10 and which is fixed to the arm 11 has an external diameter of 4 inches. In its fully extended position, the bellows has a cord length of about 5" to 5½" from bead to bead.

The lower bead 24 is secured to the arm 11 by a member indicated generally at 30 which comprises a cylindrical wall 31 coaxial with the bead 24 and terminating in a curled edge 32 which is crimped about the bead 24 and which clamps the bead against the annual edge portion 33 of a plate 34 which is employed to close off the inner end of the member 30 and of the bellows. The crimped edge 32 is formed about the bead 24 by conventional methods which form no part of the present invention, and which accordingly need not be described. The cylindrical wall 31 is turned in at the outer end to form a laternal flange 35 which is utilized to secure the member 30 to the arm 11 as by bolts or other means. In the form shown in FIGURE 2, the plate 34 is preferably welded to the wall 31 at the point indicated at 36.

In the present example, the plate 34 seals the member 30 from communication with the interior of the bellows 20 but if desired a hole may be punched in plate 34 and the bottom of the member 30 may be closed off enabling the member 30 to act as an air reservoir in communication with the interior of the bellows. In such a case the member 30 will preferably comprise a deep drawn cup assembled with the plate 34 and with the bellows 20 in the same manner as that illustrated for member 30.

The bellows 20 is secured to the frame 13 by means of a hollow structure indicated generally at 40 which comprises a pair of partially nested cup members 41 and 42 as shown. The member 42 has an annular flange portion 43 which, in conjunction with a crimping ring 44, holds the upper bead 25 of the bellows in an air-tight and mechanically secure arrangement. The members 42 and 44 may be separate members or the member 44 may be welded or brazed to the member 43 at the point indicated at 46. The ring 44 is crimped tightly about the bead 25 forcing it against the flange 43 to hold the bead in a manner similar to the lower bead 24. The cup member 41 is connected to the member 42 by means of a flanged construction which includes the parts 47, 48 and 49 as shown; any other suitable arrangement can, of course, be used. The structure 40 is in turn secured to the frame 13 by an convenient arrangement such as by nuts and bolts extending through suitable flanges or by another convenient means. It is to be understood, of course, that the structure 40 is exemplary only and that other equivalent structure may be utilized, the details of which will be dictated by the particular vehicle and suspension which employs a bellows embodying the present invention.

Figure 3:
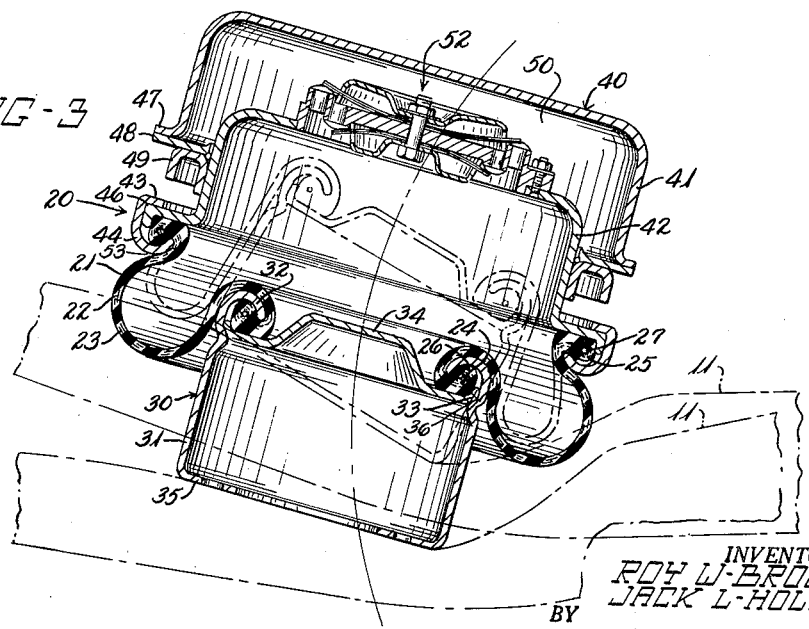
FIGURE 3 is a view similar to FIGURE 2 indicating the deflection of the bellows from neutral position to maximum compressed position.

The cup member 42 is of sufficient depth to allow the lower bead 24 to enter the bellows in the compression portion of the working stroke, and take the position shown by the dotted lines in FIGURE 3. The member 42 also acts as a reservoir of air supplementary to that contained in the air spring bellows and an additional volume of reservoir is provided by the space 50 enclosed between the members 41 and 42. A total reservoir of about 200 cubic inches, excluding the volume of the bellows, has been found satisfactory for use with the present bellows.

Communication between space 50 and the interior of member 41 is provided by a damping valve indicated generally at 52 which permits a controlled flow of air between the bellows and the reservoir 50. The construction and the operation of the damping valve 52 will not be described in detail for it forms no part of the present invention. The damping valve may be omitted if desired, and other separate damping means may be utilized in the suspension. In the absence of such a valve, communication between the bellows and the reservoir will be provided by an essentially unrestricted opening.

Figure 2:
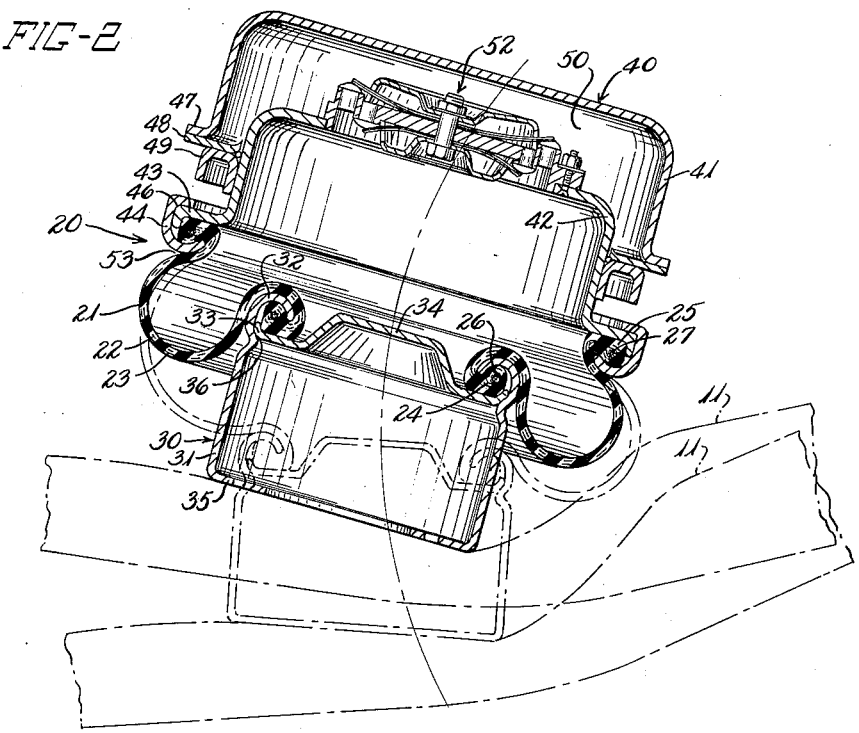
FIGURE 2 is a sectional view taken in the vertical plane of the bellows of FIGURE 1 and indicating, on an enlarged scale, the deflection of the bellows from maximum deflected position to neutral position.

In operation, the bellows is designed to take a neutral position as shown in the solid lines of FIGURES 2 and 3 and in this position the bellows has its maximum effective area, about 31 square inches and holds air at a pressure of approximately 58 lbs. per square inch for a car with a wheel loading of about 800 lbs. If the front wheel encounters a bump on the road the bellows will become compressed and the lower bead 24 will be forced upwardly through the larger bead 25 until at the extreme portion of the stroke it takes the position shown in dotted lines in FIGURE 3. As the bellows goes from the solid line position to the dotted line position of FIGURE 3 the effective area decreases until at the end of the stroke the effective area is 25 square inches. At the same time the air pressure within the bellows increases until at the end of the stroke the pressure is 80 pounds per square inch. Thus even though there is a decreasing effective area as the bellows compresses, the increasing air pressures produce an increasingly higher rate as the bellows nears the end of its compression stroke.

If the front wheel encounters a chuck hole in the road the wheel will tend to drop down into the hole, extending the bellows until at the extreme portion of the stroke the bellows will take the dotted line position shown in FIGURE 2. This same extension of the bellows also tends to occur on rebound from the compression stroke. As the bellows goes from the solid line position to the dotted line position of FIGURE 2, the effective cross sectional area of the bellows decreases to the end of the stroke at which time it has an effective area of zero square inches. At the same time the air pressure in the bellows decreases to about 47 pounds per square inch. In the extension portion of the stroke the bellows therefore builds up no restoring force as it does in the compression portion but this is not objectionable since the external forces will automatically return the bellows toward neutral position. The bellows in going from the dotted line position of FIGURE 2 to the dotted line position of FIGURE 3 has a working stroke of about 3 inches.

The manner of mounting the lower bead 24 by means of the member 30 is particularly advantageous. First it offers a convenient way to hold the bead relative to arm 11 while permitting a full telescoping movement of the beads with respect to each other. Also it controls the deflection of the bellows wall during the compression portion of the working stroke. Thus as the bellows passes from neutral position to its compressed position, the wall of the bellows rolls onto the cylindrical wall 31 of member 30 and is prevented from bulging inwardly toward the axis of the bellows. As a result of supporting the small bead in this manner the effective area of the bellows decreases slowly and the bellows retains a desirable low rate until towards the end of its stroke the increasing air pressure in the bellows overcomes the diminishing effective area and causes the rate to increase. The provision of the cylindrical wall 31 thus provides a measure of control over the bellows rate and this control may be varied by changing the contour of the wall 31 to a non-cylindrical form, the wall being shown as cylindrical only by way of example. The wall 31 has the further function of guiding the reversing movement of the bellows wall as the lower bead 25 passes through the upper bead 24. Extreme bulging of the bellows wall is thereby prevented and scuffing and abrasion of the bellows wall is minimized as the bellows rolls smoothly onto and off the member 30. The service life of the bellows is thereby extended.

The bellows illustrated and described also has a practical advantage over the prior art bellows by virtue of its self-cleaning action. It will be observed that a pocket 53 exists at the juncture of the upper bead and the bellows wall. A similar pocket exists at the same location in the previous air spring bellows and it has been observed that in these bellows the pockets tend to collect dirt and grit thrown up from the road. As a result the grit tends to abrade the bellows in the bead area and the bellows wall tends to fail prematurely at this point. With the present invention any dirt which might tend to accumulate in the pocket 53 is shed by the action of the bellows, particularly as the bellows compresses. This self-cleaning action is advantageous in prolonging the life of the bellows.

What is claimed is:

A vehicle suspension comprising a pneumatic bellows having a body of substantially inextensible, flexible material adapted to contain air under pressure and, in the normal position of said bellows, bulging freely and radially outwardly unsupported in the form of a single outwardly convex convolution, said convolution terminating in a pair of ends, each end having a diameter less than the greatest normal diameter of said convolution, one of said ends being substantially larger in diameter than the other end, said smaller end being adapted to pass toward and completely through said large diameter end in a telescoping movement during the compressive portion of the working stroke of said bellows, a rigid member supporting said large diameter end, and an axially extending support for said small end progressively engaging an increasing portion of said convolution wall during the compressive portion of said working stroke, while decreasing the effective area of said convolution to a minimum at the end of said compressive stroke portion.

References Cited in the file of this patent

UNITED STATES PATENTS

| | | |
|---|---|---|
| 1,133,337 | Tinkham | Mar. 30, 1915 |
| 1,177,142 | Rudd | Mar. 28, 1916 |
| 1,729,565 | Caretta | Sept. 24, 1929 |
| 2,257,913 | Maranville | Oct. 7, 1941 |
| 2,865,651 | Chayne et al. | Dec. 23, 1958 |
| 2,901,242 | Elliott et al. | Aug. 25, 1959 |

FOREIGN PATENTS

| | | |
|---|---|---|
| 446,516 | Germany | July 7, 1927 |
| 400,616 | Great Britain | Oct. 24, 1933 |